US008531488B2

(12) United States Patent
Ohba et al.

(10) Patent No.: US 8,531,488 B2
(45) Date of Patent: Sep. 10, 2013

(54) IMAGE PROCESSING APPARATUS AND METHOD, CONTENT CREATING SUPPORT APPARATUS AND METHOD AND DATA STRUCTURE OF IMAGE FILE WITH SPEED MAP TO DETERMINE SPEED OF VIEWPOINT CHANGE

(71) Applicant: Sony Computer Entertainment Inc., Tokyo (JP)

(72) Inventors: Akio Ohba, Kanagawa (JP); Hiroyuki Segawa, Kanagwa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/714,752

(22) Filed: Dec. 14, 2012

(65) Prior Publication Data
US 2013/0100171 A1   Apr. 25, 2013

Related U.S. Application Data

(63) Continuation of application No. PCT/JP2011/001244, filed on Mar. 3, 2011.

(30) Foreign Application Priority Data

Jun. 24, 2010   (JP) ................................. 2010-144171

(51) Int. Cl.
*G09G 5/00* (2006.01)
*G06F 3/048* (2013.01)

(52) U.S. Cl.
USPC ............ 345/672; 345/660; 715/799; 715/784

(58) Field of Classification Search
None
See application file for complete search history.

(56) References Cited

U.S. PATENT DOCUMENTS 5,999,187 A * 12/1999 Dehmlow et al. ............. 345/420
6,313,838 B1 * 11/2001 Deering ........................ 345/420

(Continued)

FOREIGN PATENT DOCUMENTS

JP   9200803 A   7/1997
JP   11175758 A   7/1999

(Continued)

OTHER PUBLICATIONS

International Search Report for corresponding PCT Application No. PCT/JP2011/001244, dated Apr. 5, 2011.

(Continued)

*Primary Examiner* — Carlos Perromat
(74) *Attorney, Agent, or Firm* — Matthew B. Dernier, Esq.; Gibson & Dernier LLP

(57) ABSTRACT

A hard disk drive stores hierarchical image data, a speed map holding, for each tile image, an index of the processing time required to render a tile image having a predetermined image size obtained by partitioning the image, and scenario data which defines viewpoint shifting. In a control unit of an information processing apparatus having a function of displaying an image, an input information acquisition unit acquires information with respect to the user's input operation via an input device. A loading unit loads necessary data for image displaying from the hard disk drive. A shifting condition adjustment unit adjusts the viewpoint shifting speed based upon the speed map. A frame coordinate determination unit sequentially determines frame coordinates of a display area. A decoding unit decodes compressed image data. A display image processing unit renders a display image.

19 Claims, 7 Drawing Sheets

(56) References Cited

U.S. PATENT DOCUMENTS

| | | |
|---|---|---|
| 6,563,999 B1 | 5/2003 | Suzuoki |
| 6,587,110 B1 * | 7/2003 | Kunimatsu et al. ........... 345/502 |
| 6,967,651 B2 | 11/2005 | Endoh |
| 8,032,298 B2 * | 10/2011 | Han .............................. 701/455 |
| 2002/0180734 A1 | 12/2002 | Endoh |
| 2006/0267982 A1 * | 11/2006 | Aguera y Arcas ............ 345/428 |
| 2008/0316226 A1 * | 12/2008 | Weibrecht et al. ............ 345/629 |
| 2010/0040297 A1 * | 2/2010 | Ohba et al. .................... 382/232 |

FOREIGN PATENT DOCUMENTS

| | | |
|---|---|---|
| JP | 2002197016 A | 7/2002 |
| WO | 0143077 A1 | 6/2001 |

OTHER PUBLICATIONS

International Preliminary Examination Report on Patentability and Written Opinion for corresponding PCT Application No. PCT/JP2011/001244, dated Jan. 15, 2013.

* cited by examiner

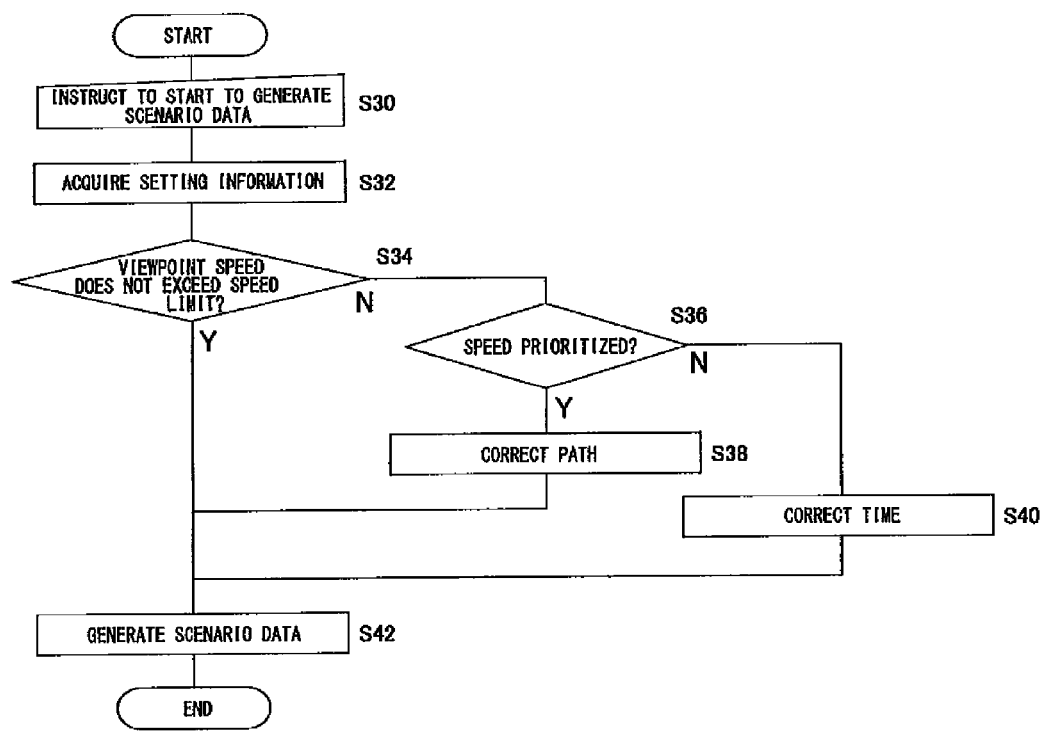

IMAGE PROCESSING APPARATUS AND METHOD, CONTENT CREATING SUPPORT APPARATUS AND METHOD AND DATA STRUCTURE OF IMAGE FILE WITH SPEED MAP TO DETERMINE SPEED OF VIEWPOINT CHANGE

TECHNICAL FIELD

The present invention relates to an image processing technology for enlarging/reducing or shifting vertically and horizontally images shown on a display.

BACKGROUND ART

There are proposed home entertainment systems capable of not only executing game programs but also playing the video. In these home entertainment systems, a GPU generates three-dimensional images using polygons (e.g., U.S. Pat. No. 6,563,999).

Related Art List

U.S. Pat. No. 6,563,999.

DISCLOSURE OF THE INVENTION

Problem to be Solved by the Invention

With such an image display technique, in a case of realizing a display mechanism which is capable of moving the viewpoint by enlarging, reducing, or otherwise scrolling the image to be displayed, such an arrangement is preferably configured to continuously and smoothly change the viewpoint. However, in some cases, such an arrangement is not enough to consecutively execute the display update processing for the moving viewpoint due to various kinds of reasons, e.g., the data size of the image, the processing capacity of the display system, and so forth. In some cases, this leads to a problem of frame dropping, leading to the user experiencing sensations of discomfort.

The present invention has been made in order to solve such a problem. Accordingly, it is a general purpose of the present invention to provide an image processing technique for allowing the viewpoint to be moved smoothly.

Means to Solve the Problem

An embodiment of the present invention relates to an image processing apparatus. The image processing apparatus comprises: an input information acquisition unit configured to acquire input information related to viewpoint shift on an image subjected to display; a speed map storage unit configured to store a speed map holding a distribution of an index of processing time required to render a part of the image; a shifting condition adjustment unit configured to adjust a viewpoint shifting speed that corresponds to the input information based upon the index of processing time corresponding to a shifting path held by the speed map; a frame coordinate determination unit configured to determine frame coordinates of a frame to be displayed based on the viewpoint shifting speed thus adjusted; and a display image processing unit configured to process image data corresponding to the frame coordinates so as to render a display image.

Another embodiment of the present invention relates to a content creating support apparatus. The content creating support apparatus is configured to support an operation for creating scenario data that defines viewpoint shifting in content in which an image is displayed while the viewpoint on the image is being shifted. The content creating support apparatus comprises: a setting information acquisition unit configured to acquire setting information with respect to coordinates of a plurality of key frames that function as frame waypoints, and to a viewpoint shifting time taken for the viewpoint to be shifted between the key frames, set by the user so as to define the viewpoint shifting; a speed map storage unit configured to store a speed map holding a distribution of an index of processing time required to render a part of the image; a shifting speed judgment unit configured to judge whether or not the viewpoint shifting speed that corresponds to the setting information exceeds a speed limit imposed on a path of the viewpoint shifting, the speed limit being acquired from the index of the processing time; a setting information correcting unit configured to correct the setting information when the viewpoint shifting speed exceeds the speed limit imposed on the path of the viewpoint shifting; and a scenario data generating unit configured to generate final scenario data based upon a corrected result obtained by the setting information correcting unit.

Yet another embodiment of the present invention relates to an image processing method. The image processing method comprises: acquiring input information related to viewpoint shift on an image subjected to display; reading out, from memory, a speed map holding a distribution of an index of a processing time required to render a part of the image; adjusting a viewpoint shifting speed that corresponds to the input information based upon the index of processing time corresponding to a shifting path held by the speed map; determining frame coordinates of a frame to be displayed based on the viewpoint shifting speed thus adjusted; and processing the image data corresponding to the frame coordinates so as to render a display image to be stored in a frame memory.

Yet another embodiment of the present invention relates to a content creating support method. The content creating support method is configured as a method for supporting an operation for creating scenario data that defines viewpoint shifting in content in which an image is displayed while the viewpoint on the image is being shifted. The content creating support method comprising: acquiring setting information with respect to coordinates of a plurality of key frames that function as frame waypoints, and to a viewpoint shifting time taken for viewpoint to be shifted between the key frames, set by the user so as to define the viewpoint shifting; reading out, from a memory, a speed map holding a distribution of an index of a processing time required to render a part of the image; judging whether or not a viewpoint shifting speed that corresponds to the setting information exceeds a speed limit imposed on a path of the viewpoint shifting, the speed limit being acquired from the index of the processing time; correcting the setting information when the viewpoint shifting speed exceeds the speed limit imposed on the path of the viewpoint shifting; and generating final scenario data based upon a corrected result obtained by the setting information correction, and storing the final scenario data in a memory.

Yet another embodiment of the present invention relates to a data structure of an image file. The data structure is employed as a data structure of an image file to be read out from a storage device in order to display an image while the viewpoint is being shifted. The data structure comprises image data to be displayed; and a speed map holding a distribution of an index of a processing time required to render a part of the image, which is to be referred to in order to determine a upper limit of a viewpoint shifting speed. The image data and the speed map are associated with each other.

It should be noted that any combination of the aforementioned components or any manifestation of the present invention may be mutually substituted between a method, apparatus, system, computer program, and so forth, which are effective as an embodiment of the present invention.

Advantage of the Present Invention

With the present invention, the viewpoint can be smoothly shifted in the image display operation regardless of display conditions.

BRIEF DESCRIPTION OF THE DRAWINGS

FIG. 11 is a flowchart showing a procedure for supporting the operation for creating the scenario data according to the present embodiment.

BEST MODE FOR CARRYING OUT THE INVENTION

With the present embodiment, the image data to be processed has a hierarchical structure which is constituted by images of different resolutions generated by reducing an original image in multiple stages. An image at each hierarchical level is divided into one or more tile images. For example, an image of the lowest resolution is made up of a single tile image, whereas an image of the highest resolution is made up of a highest number of tile images. When the image is to be displayed at a given resolution in the image display operation, by switching the tile image currently used to perform the rendering to a tile image of a different corresponding hierarchical level, such an arrangement is capable of displaying an enlarged image or otherwise a reduced image at a high speed.

Figure 1:
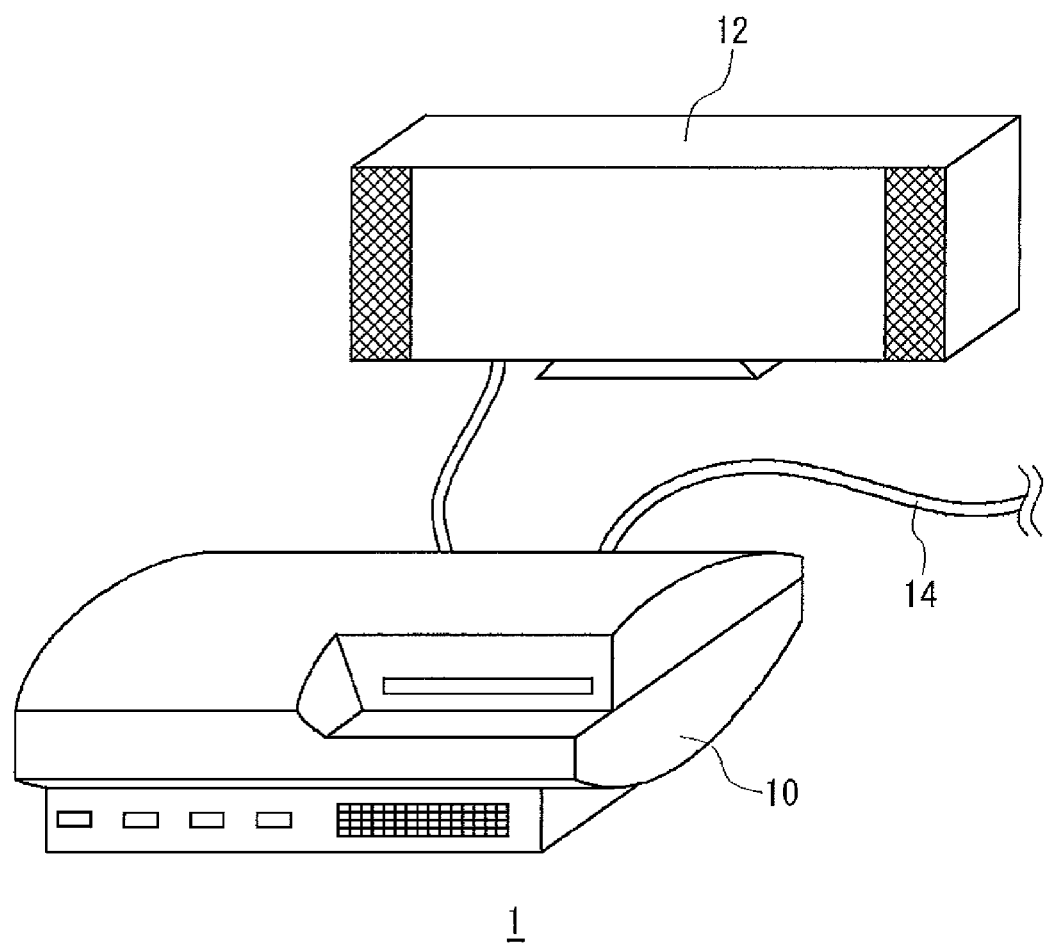
FIG. 1 illustrates a usage environment of an information processing system to which the present embodiment is applicable.

First, description will be made regarding a basic display mechanism for images having a hierarchical structure as described above. FIG. 1 illustrates a usage environment of an information processing system 1 to which an embodiment of the present invention is applicable. The information processing system 1 includes an information processing apparatus 10 configured to execute a program including an image processing module, and a display device 12 configured to output processing results obtained by the information processing apparatus 10. The display device 12 may be configured as a TV including a display configured to output an image and a speaker configured to output sound.

The display device 12 may be connected to the information processing apparatus 10 via a cable or connected wirelessly via a wireless LAN (Local Area Network). With the information processing system 1, the information processing apparatus 10 may be configured to be connected to an external network such as the Internet or the like via a cable 14, and to download and acquire a content file including hierarchically-compressed image data. It should be noted that the information processing apparatus 10 may be connected wirelessly to an external network.

The information processing apparatus 10 is configured to perform processing for changing the display area, examples of which include: processing for enlarging or reducing an image to be displayed on a display of the display device 12; and processing for moving an image in the horizontal direction or otherwise in the vertical direction. Such image movement processing and image enlargement/reduction processing are each regarded as movement of the user's virtual viewpoint. When the user gives a request to move the viewpoint by operating the input device while viewing the image displayed on the display, the input device transmits the viewpoint shifting request signal to the information processing apparatus 10. Also, the information processing apparatus 10 is configured to automatically change the display area based upon data configured beforehand as data to determine the change of the viewpoint, which is additional data to be supplied together with the image data as the image display content.

Figure 2:
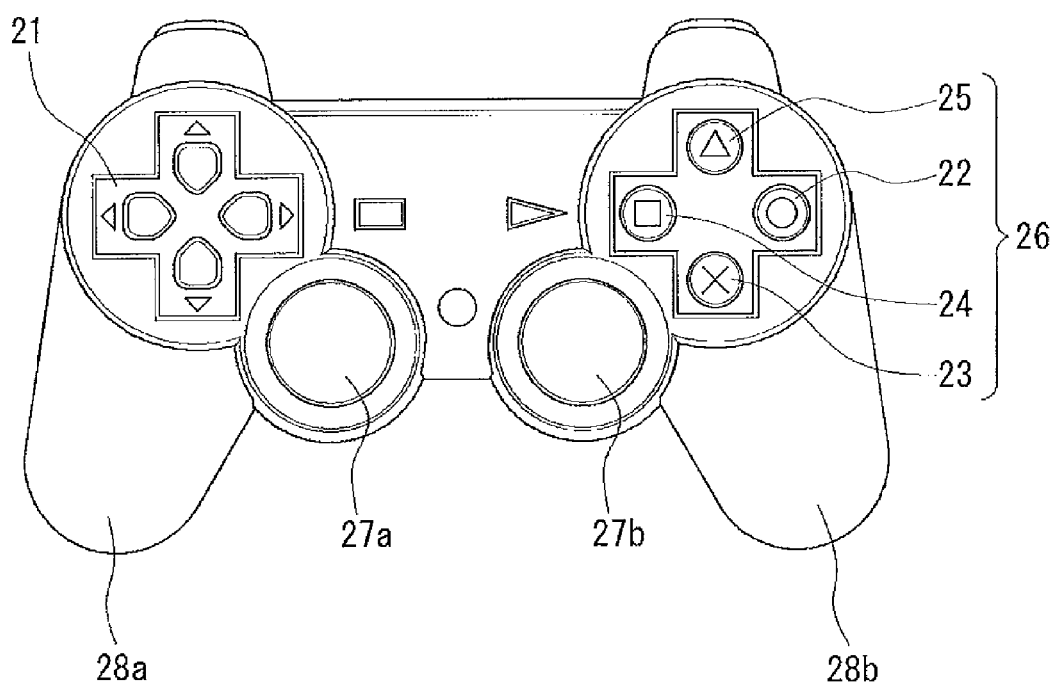
FIG. 2 illustrates an external configuration of the input device which is applicable to the information processing system shown in FIG. 1.

FIG. 2 illustrates an external configuration of the input device 20. As operation means operable by the user, the input device 20 is provided with a directional key 21, analog sticks 27a and 27b, an operation button 26 that includes four types of buttons, and hand grip portions 28a and 28b. The operation button 26 that includes four types of buttons is formed with a circle-marked button 22, an x-marked button 23, a square-marked button 24, and a triangle-marked button 25.

In an information processing system 1, functions for inputting a request for enlarging/reducing a display area and a request for scrolling in a vertical or horizontal direction in addition to a content startup/shutdown request and a request for executing various functions according to content are assigned to the operation means of the input device 20. For example, a function of inputting a request for enlarging/reducing an image is assigned to the analog stick 27b on the right side. The user can input a request for reducing a display image by pulling the analog stick 27b toward the user and input a request for enlarging the display image by pushing the analog stick 27b away from the user. The speed of changing an enlargement ratio may be adjusted according to the angle of tilting the analog stick 27b.

A function of inputting a request for scrolling a display area is assigned to the analog stick 27a. Tilting the analog stick 27a in any direction, the user can input a request for scrolling in the direction. The speed of scrolling may be adjusted according to the tilting angle. A function of inputting a request for moving the display area may be assigned to another operation means. For example, a function of inputting a scroll request may be assigned to the directional key 21.

Furthermore, in order to provide various kinds of functions as described below, a function of moving a cursor displayed on an image, and a function of selecting a file or a command, are also assigned to the input device 20. Also, the input device 20 may be configured as an ordinary input device such as a pointing device, mouse, keyboard, touch panel, or the like. Such function assignments as described above may be determined according to the kind of input device 20.

The input device 20, having the function of transmitting various inputted request signals, such as a viewpoint shift request signal, to the information processing apparatus 10, is configured to be capable of wirelessly communicating with the information processing apparatus 10 in this embodiment. The input device 20 and the information processing apparatus 10 may establish wireless connection with each other using the Bluetooth (registered trademark) protocol, the IEEE 802.11 protocol, or the like. Also, the input device 20 may be connected to the information processing apparatus 10 via a cable, and may transmit a viewpoint shift request signal or the like to the information processing apparatus 10.

Figure 3:
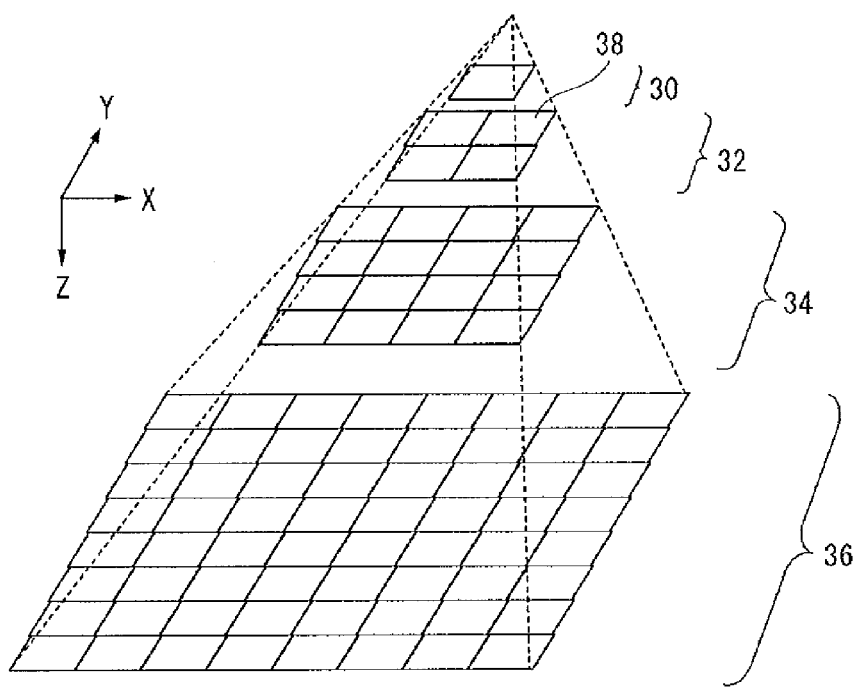
FIG. 3 is a schematic diagram showing a hierarchical structure of image data that is used in the present embodiment.

FIG. 3 is a schematic diagram showing a hierarchical structure of image data that is used in the present embodiment. The image data has a hierarchical structure comprised of a 0th hierarchical level 30, 1st hierarchical level 32, 2nd hierarchical level 34, and 3rd hierarchical level 36 in a depth (Z axis) direction. Note that while only four hierarchical levels are shown in FIG. 3, the number of hierarchical levels is not limited thereto. Hereinafter, image data having a hierarchical structure like this will be referred to as "hierarchical data".

The hierarchical data shown in FIG. 3 has a quadtree hierarchical structure, and the hierarchical levels have each one or more tile images 38. All the tile images 38 are formed in the same size having the same number of pixels, for example, 256 by 256 pixels. The image data at each hierarchical level represents a single image at different resolutions, and the image data at the 2nd hierarchical level 34, 1st hierarchical level 32, and 0th hierarchical level 30 are generated by reducing an original image of the 3rd hierarchical level 36 having the highest resolution in a plurality of stages. For example, the resolution of the Nth hierarchical level (N represents an integer greater than or equal to 0) may be ½ of the resolution of the (N+1)th hierarchical level in both the horizontal (X axis) and vertical (Y axis) directions.

With the image processing apparatus 10, the hierarchical data, compressed in a predetermined compression format, is stored in a storage device. Before the data is displayed on the display, the hierarchical data is read out from the storage device, and is decoded. The information processing apparatus 10 according to the present embodiment has decoding functions compatible with multiple kinds of compression formats and is therefore capable of decoding compressed data in the S3TC format, the JPEG format, and the JPEG2000 format, for instance.

The hierarchical structure of the hierarchical image data, as shown in FIG. 3, forms a virtual three-dimensional space with the horizontal direction set on the X axis, the vertical direction set on the Y axis, and the depth direction set on the Z axis. After the information processing apparatus 10 derives the amount of shift of a display area from a viewpoint shift request signal supplied from the input device 20, the information processing apparatus 10 derives the coordinates of the four corners of a frame (frame coordinates) in a virtual space using the amount of shift. Alternatively, the information processing apparatus 10 sequentially reads out the frame coordinates of the display area, defined in the content data beforehand.

The frame coordinates in the virtual space are used in loading compressed data into a main memory and in generating images to be displayed, to be discussed later. Note that the information processing apparatus 10 may derive information identifying a desired hierarchical level and the texture coordinates (UV coordinates) of the hierarchical level instead of the frame coordinates in the virtual space. Such a combination of hierarchical level identifying information and the texture coordinates will also be referred to as the "frame coordinates" hereafter.

Figure 4:
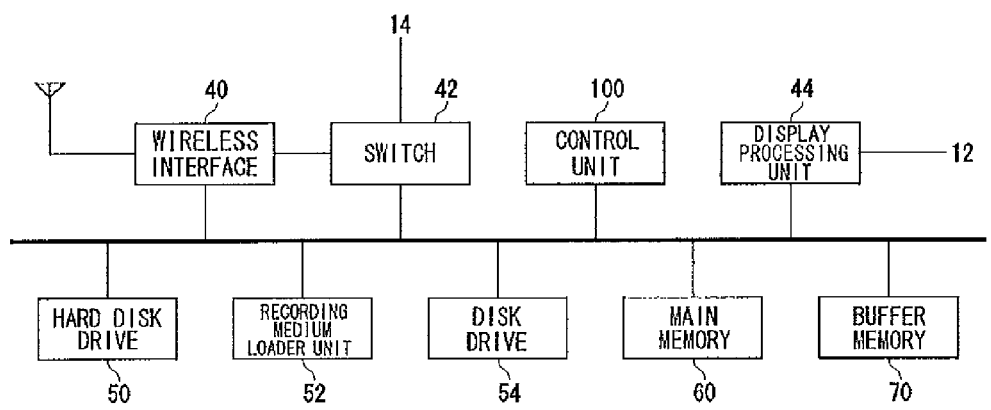
FIG. 4 shows a configuration of the information processing apparatus according to the present embodiment.

Next, description will be made regarding a basic configuration of an information processing apparatus according to the present embodiment. FIG. 4 shows a configuration of the information processing apparatus 10. The information processing apparatus 10 is configured by including a wireless interface 40, a switch 42, a display processing unit 44, a hard disk drive 50, a recording medium loader unit 52, a disk drive 54, main memory 60, buffer memory 70, and a control unit 100. The display processing unit 44 has a frame memory that buffers data to be displayed on the display of the display device 12.

The switch 42, which is an Ethernet (registered trademark) switch, is a device that transmits and receives data by connecting to an external device via a wired or wireless communication means. The switch 42, which connects to an external network via a cable 14, is so configured as to be able to receive a content file or the like from a server. Also, the switch 42 connects the wireless interface 40 which connects to the input device 20 via a predetermined wireless communication protocol. A signal input by the user via the input device 20 is supplied to the control unit 100 via the wireless interface 40 and the switch 42.

The hard disk drive 50 functions as a storage device for storing data. The data such as a content file received via the switch 42 is stored in the hard disk driver 50. The recording medium loader unit 52 reads out data from a removable recording medium when the removable recording medium such as a memory card is mounted. When a read-only ROM disk is mounted, the disk drive 54 recognizes the ROM disk by driving it and then reads out the data. The ROM disk may be an optical disk, a magneto-optical disk or the like. An image data and a content file may be stored in such a recording medium.

The control unit 100 comprises a multi-core CPU where each CPU has a general-purpose processor core and a plurality of simple processor cores. The general-purpose processor core is called PPU (PowerPC Processor Unit), and the remaining processor cores are called SPUs (Synergistic Processor Units).

The control unit 100 includes a memory controller connected to the main memory 60 and the buffer memory 70. The PPU has a register and is provided with a main processor as an entity for execution of calculation so as to efficiently assign a task serving as a basic processing unit in the application to execute to each SPU. Note that the PPU itself may execute the task. The SPU is provided with a register, a sub-processor as an entity for execution of calculation, and local memory as a local storage area. The local memory may be used as the buffer memory 70.

The main memory 60 and the buffer memory 70, which are storage devices, are each configured as RAM (Random Access Memory). The SPU has a dedicated DMA (Direct Memory Access) controller as a control unit. Thus, the SPU can achieve high-speed data transfer between the main memory 60 and the buffer memory 70, and can also achieve high-speed data transfer between frame memory in the display processing unit 44 and the buffer memory 70. The control unit 100 according to the present embodiment has a plurality of SPU operated in parallel with one another, thereby achieving a high-speed image processing function. The display processing unit 44, which is connected to the display device 12, outputs an image processing result according to a user's request.

In order to smoothly update a displayed image when the information processing apparatus 10 performs enlarging/reducing processing or scrolling processing for the displayed image, the information processing apparatus 10 loads a part of the compressed image data into the main memory 60 from the hard disk drive 50. Furthermore, the information processing apparatus 10 may be configured to predict a region which will be requested later based upon the direction in which the viewpoint has already been shifted, to read out the region thus predicted so as to decode such a different additional part of the image data loaded into the main memory 60, and to store the image data thus decoded in the buffer memory 70. Thus, such an arrangement is capable of immediately switching the image to be used to generate a display image when it is required in a subsequent stage.

Figure 5:
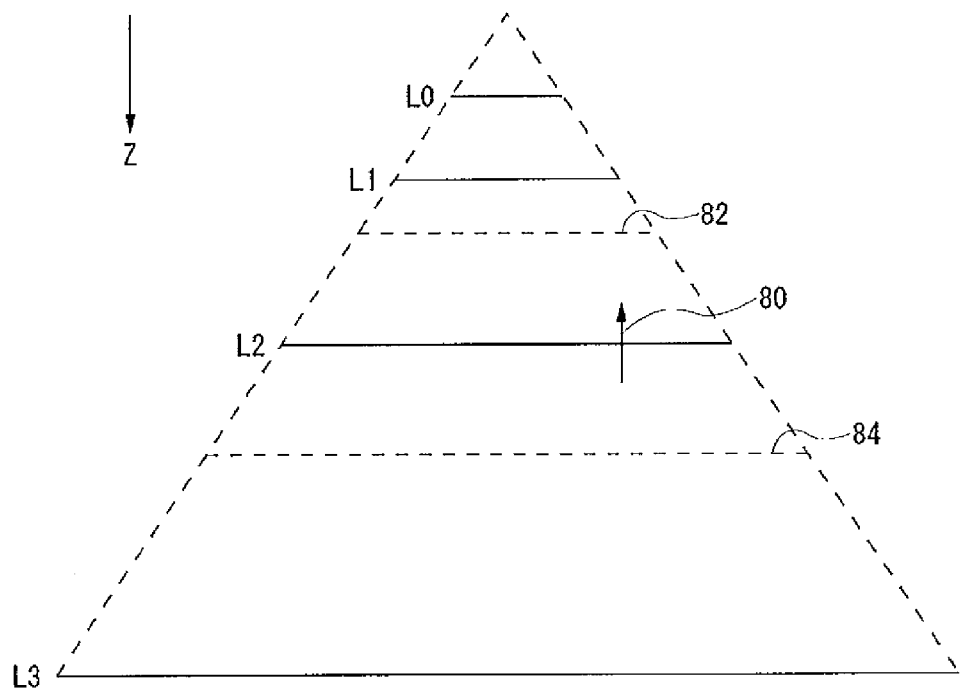
FIG. 5 is a diagram to explain a prefetch processing of image data according to the present embodiment.

FIG. 5 is a diagram to explain a prefetch processing of image data. FIG. 5 shows a structure of hierarchical image data, and the respective hierarchical levels are expressed by L0 (0th hierarchical level), L1 (1st hierarchical level), L2 (2nd hierarchical level), and L3 (3rd hierarchical level) starting from top. In a hierarchical data structure shown in FIG. 5, a position in the depth (Z axis) direction indicates the resolution. That is, the closer to L0 the position in the Z axis is, the lower the resolution will be, whereas the closer to L3 the position in the Z axis is, the higher the resolution will be. It should be noted that, directing attention to the scale of the image displayed on the display, the position in the depth direction corresponds to the scale ratio. With such an arrangement, with the scale ratio of the display image ratio at L3 as 1, the scale ratio at L2 is ¼, the scale ratio at L1 is ¹⁄₁₆, and the scale ratio at L0 is ¹⁄₆₄.

Thus, as the display image is changed from the L0 side to the L3 side along the depth direction, the displayed image is enlarged. In contrast, as the display image is changed from the L3 side to the L0 side, the displayed image is reduced. An arrow 80 indicates that the viewpoint shift request signal received from the user gives a request to reduce the displayed image such that it crosses the level of the scale factor of ¼ (L2). The information processing apparatus 10 sets each of the positions of L1 and L2 in the depth direction, which are prepared for the tile images 38, to a prefetch boundary in the depth direction. When the image change request signal is an instruction to change the image such that it crosses such a prefetch boundary, prefetch processing is started.

When the scale ratio of the display image is in the vicinity of L2, the display image is generated using a tile image at L2 (second hierarchical level). Specifically, when the scale ratio of the image to be displayed lies between a switching boundary 82 at which the tile image is to be switched between the L1 tile image and the L2 tile image, and a switching boundary 84 at which the tile image is to be switched between the L2 tile image and the L3 tile image, the L2 tile image is employed. Thus, when a request is made to reduce the image as indicated by the arrow 80, the displayed image is switched from an enlarged image generated based upon the tile image L2 to a reduced image. At the same time, tile images 38 which will be required later are identified based upon the image change request signal, and the tile images 38 thus identified are decoded. In the example of FIG. 5, when the requested scale ratio is to be changed such that it crosses the L2 boundary level according to the viewpoint shift request signal, the information processing apparatus 10 preliminarily reads out the tile image 38 that corresponds to L1 level prepared for reduction, from the hard disk drive 50 or the main memory 60, then decodes the tile image 38 and writes the decoded tile image 38 to the buffer memory 70.

Description has been made regarding the prefetch processing in the depth direction. Also, prefetch processing in the vertical direction and prefetch processing in the horizontal direction can be performed in the same manner as described above. Specifically, the anticipated prefetch boundary is set for the image data expanded in the buffer memory 70, and when the display position is changed according to the image change request signal such that it crosses the prefetch boundary thus set, the prefetch processing is started.

The information processing apparatus 10 is capable of sequentially shifting the display area so as to display an image according to a viewpoint shift request input by the user via the input device 20 as described above. In addition, the information processing apparatus 10 is capable of shifting the display area so as to display an image in a manner determined beforehand. In this case, data which determines the change of the frame coordinates over time (which will be referred to as "scenario data" hereafter) is generated beforehand, and is used as additional data for the hierarchical data, thereby generating a content file. The information processing apparatus 10 is configured to shift the viewpoint so as to display a predetermined frame at a predetermined timing with reference to the scenario data loaded into the main memory 60. Thus, such an arrangement provides a display manner in which the display area is sequentially shifted in the image to be displayed, according to the sequence designed by the content creator.

Figure 6:
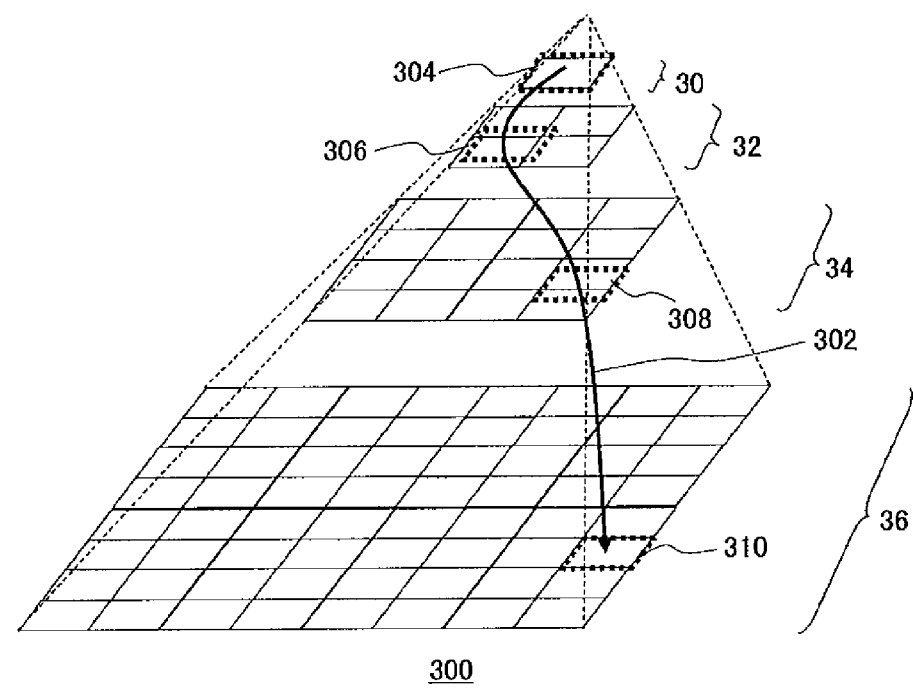
FIG. 6 is a schematic diagram showing the scenario data according to the present embodiment.

FIG. 6 is a schematic diagram showing the scenario data. In this drawing, for the hierarchical data 300, the scenario data is defined as indicated by an arrow 302. Here, each dotted rectangle shown on each level represents a frame determined by the scenario data, i.e., a key frame. That is to say, in this example, the shift of the viewpoint is determined such that the image is displayed in order of a key frame 304 on the 0th hierarchical level 30, a key frame 306 on the first hierarchical level 32, a key frame 308 on the second hierarchical level 34, and a key frame 310 on the third hierarchical level 36.

The scenario data is configured as a file which defines identification information for the hierarchical data to be displayed, the frame coordinates of the key frame, the time interval taken for the viewpoint to reach the next key frame, and so forth. The scenario data may be written in a markup language such as XML which can be interpreted by the information processing apparatus 10. In this stage, the information processing apparatus 10 reads out the scenario data from the main memory 60, and calculates the frame parameters for each frame at each time point defined based upon the frame rate by interpolating the key frames by means of linear interpolation, spline interpolation, or the like. The information processing apparatus 10 is configured to decode and render a picture based upon the frame parameters thus generated, thereby sequentially displaying the respective frames.

Next, description will be made regarding an example of the scenario data written in XML. It should be noted that, in this example, frame parameters for a given frame (X direction offset, Y direction offset, and enlargement ratio), which are defined relative to a reference frame having known frame coordinates, are employed instead of the frame coordinates.

TABLE 1

| | |
|---|---|
| <?xml version="1.0" encoding="utf-8"?> | (1) |
| <Viewer> | (2) |
|   <FileList> | (3) |
|     <File name="INDEX"/> | (4) |
|   </FileList> | (5) |
|   <InitCameraPosition x="−0.2" y="−0.2" scale="0.6"/> | (6) |
|   <Section> | (7) |
|     <Event type="change" name="INDEX" wait="0.0"> | (8) |
|       <CameraPosition x="−0.2" y="−0.2" scale="0.6"/> | (9) |
|     </Event> | (10) |
|   </Section> | (11) |
|   <Section> | (12) |
|     <Event type="camera" name="camera1" wait="0.0"> | (13) |
|       <Interpolator | (14) |
|         duration='4.0' | (15) |
|         type='linear' | (16) |
|         key='0 0.5 1.0' | (17) |
|         keyValue=' | (18) |
|             −0.2 −0.2 0.6 | (19) |
|             −0.1 −0.1 0.5 | (20) |
|             −0.1 −0.1 0.25 | (21) |
|         '/> | (22) |
|     </Event> | (23) |
|   </Section> | (24) |
|   </Story> | (25) |
| </Viewer> | (26) |

In the above list, lines 7-11 indicate that image data named "INDEX" should be displayed. The frame from the image with the frame parameters (−0.2, −0.2, 0.6) is displayed as an initial image. Lines 12-24 define how the display area is moved. More specifically, the display area is moved over a period of four seconds (line 15) and moved linearly (line 16). At points of time 0, 0.5, and 1.0 (line 17), where 0 denotes the start time and 1.0 denotes the end time, frames with the frame parameters (−0.2, −0.2, 0.6), (−0.1, −0.1, 0.5), and (−0.1, −0.1, 0.25) are respectively displayed (lines 19-21). As described above, when the viewpoint is shifted, each frame written to the scenario data as a waypoint frame will be referred to as "key frame".

As described above, by defining multiple frame coordinate points and their respective display timings, a content where the displayed image changes only with an instruction input to start the content by a user, as if it were moving image, can be achieved. Also, in the scenario data, the user's operation or the position of the viewpoint may be associated with the coordinate point of the frame to be displayed.

For example, upon pressing the circle-marked button 22 in a state in which a certain area is displayed, the display frame may be shifted to the nearest neighbor frame from among the frames written in the scenario data. Also, upon performing a forward-shifting operation or otherwise a backward-shifting operation via the directional key 21 of the input device 20, the display area may be shifted in the frame order written in the scenario data. By configuring such an arrangement, for example, in a case in which the target to be displayed is newspaper or magazine content, such an arrangement allows the display area to be shifted in units of article, or is capable of displaying an image so as to be guided to a particular recommended area to the user.

Also, similar configuration can be applied to the embodiment where the display image is switched to a different hierarchical image data, when the display area matches a predetermined link area in the displayed image. With such an arrangement, when the display image enters a predetermined region including such a link area, the display area may be guided to the link area. For example, in the image data in which icons each representing a corresponding one of various kinds of functions provided by an electrical appliance are arranged, each icon area may be set to a link area, and each link area may be linked to image data of an explanatory note which explains the corresponding function represented by the icon. When the user moves the display area such that it approaches an icon when displaying such an image on which such icons are arranged, such an arrangement is configured to display an explanatory note for describing the function represented by the icon.

With the image display technique according to the present embodiment, the image display is performed in a manner such that the viewpoint is continuously moved in a virtual three-dimensional space generated based upon the hierarchical data, regardless of the input ways according to which the viewpoint is to be shifted, examples of which include the user's input operation for inputting a viewpoint shift request, scenario data, and so forth. With such an embodiment, it is important to display an image such that the viewpoint is shifted naturally, unlike a moving image display in which multiple frames are consecutively displayed.

In the viewpoint shifting operation, there is a need to decode and render an image in the display area to be updated while continuously shifting the position at a frame rate determined depending on the vertical synchronization frequency of the display device. In this processing, in order to smoothly update the displayed image according to the shifting viewpoint, the prefetch processing is performed, or a peripheral area is decoded and stored in the buffer memory 70 having a size that is sufficiently larger than the frame size, which is employed as an effective method.

However, as the requested viewpoint shifting speed becomes greater, the range of viewpoint shifting also becomes greater. This leads to an increased number of additional steps required to update the displayed image, such as loading additional compressed image data, decoding such additional compressed image data, etc. Thus, there is a high probability that there is not enough time to update the displayed image. It may lead to a problem in that the display image updating is temporarily suspended in the middle of shifting or otherwise is discontinuously performed. The allowable viewpoint shifting speed varies depending on the processing capacity of the display system, the image compression format, and so forth. Furthermore, the allowable viewpoint shifting speed varies depending on the image density even in the same image. For this reason, there is a need to modify the control condition for viewpoint shifting, in consideration of the display system, the image data, and so forth, at a stage of creating content displaying the image.

In order to solve such a problem, with the present embodiment, the upper-limit viewpoint shifting speed distribution is prepared as a map associated with the position of the image plane, and is used as additional data of the hierarchical image data. Such a map is prepared for each level of the hierarchical data. For example, the map data has a hierarchical structure configured to hold a value which is used as an index of the allowable shifting speed for each tile image that belongs to each level. Such data will be referred to as "speed map" hereafter. When the hierarchical image data is generated, the speed map is generated based upon the data size of each tile image and the estimated processing capacity of the display system. In this case, the processing capacity of the display system is acquired as described later. It should be noted that such an index may be determined not only for each tile image, but also for each plurality of tile images, for each section obtained by partitioning an image according to a predetermined rule, for each area of each image component, or the like.

When the image is to be displayed, the maximum viewpoint shifting speed at which the viewpoint is shifted from a given viewpoint to a different viewpoint is adjusted, with reference to the speed map. Furthermore, when the scenario data is generated, the period of time taken to shift the image between the key frames defined in the scenario data, or otherwise the path via which the image is shifted between the key frames is adjusted. Description will be made below regarding an apparatus configured to perform an image display operation with reference to the speed map, and an apparatus configured to support a scenario data generating operation with reference to the speed map. Both the apparatuses can be realized by means of the same configuration as that of the information processing apparatus 10 described with reference to FIG. 4. Although in the following explanation, the configurations of control units 100 of the information processing apparatuses 10 having respective functions are described separately, these configurations may be included in the information processing apparatus 10 so as to form a single unit.

Figure 7:
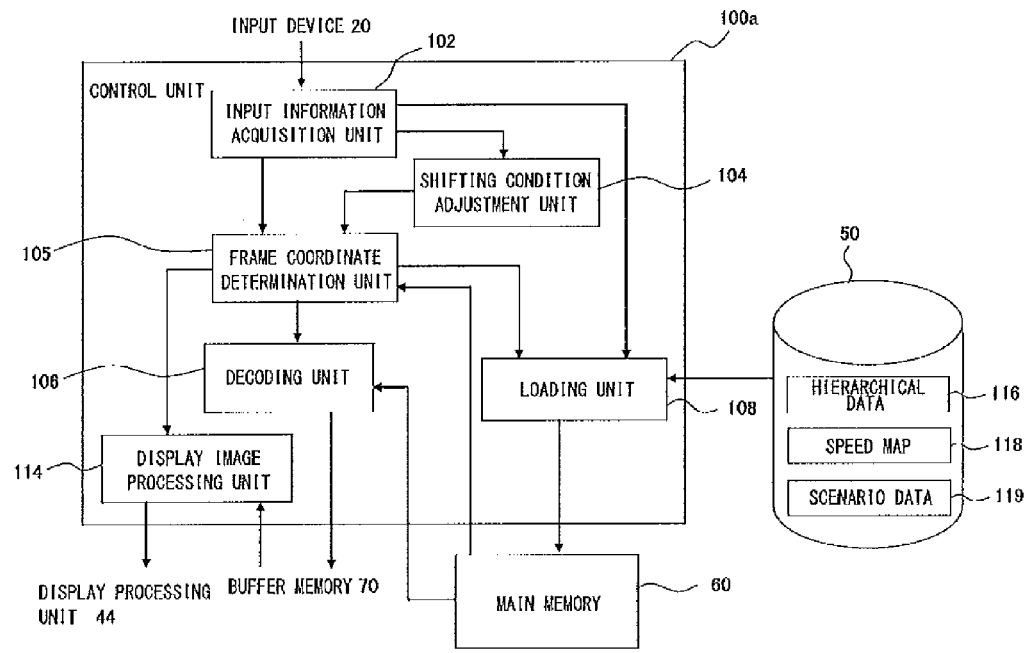
FIG. 7 is a diagram showing a detailed configuration of a control unit having a function of displaying an image according to the present embodiment.

FIG. 7 shows a detailed configuration of a control unit 100a having a function of displaying an image. The hard disk drive 50 stores hierarchical data 116, a speed map 118, and scenario data 119. In a case in which the image display is performed in only a single mode in which the display area is sequentially shifted according to a viewpoint shifting request from the user, the scenario data 119 may be omitted.

The control unit 100a includes an input information acquisition unit 102 configured to acquire information with respect to an operation performed by the user via the input device 20, a loading unit 108 configured to load data necessary for the image display operation from the hard disk drive 50, a shifting condition adjustment unit 104 configured to adjust the shifting speed based upon the speed map, a frame coordinate determination unit 105 configured to sequentially determine the frame coordinates for the display area, a decoding unit 106 configured to decode compressed image data, and a display image processing unit 114 configured to render a display image.

Figure 9:
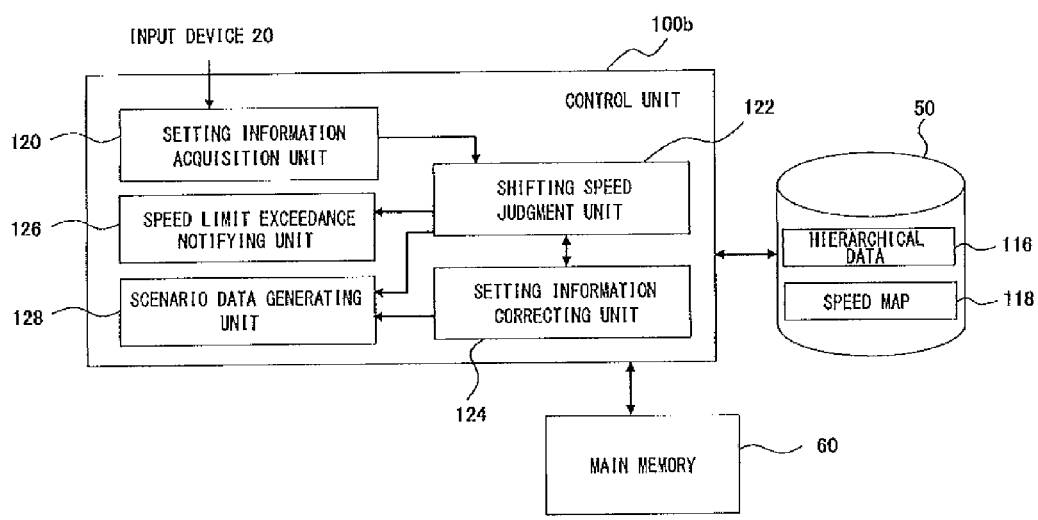
FIG. 9 is a diagram showing a detailed configuration of a control unit having a function of supporting the scenario data generating operation according to the present embodiment.

In FIG. 7 and FIG. 9 described later, each component represented as a functional block configured to perform various kinds of processing may be realized by means of hardware devices such a CPU (Central Processing Unit), memory, and other LSIs, or may be realized by means of software components such as a program or the like loaded into the main memory 60. As described above, the control units 100, 100a, and 100b each include a single PPU and multiple SPUs. Each function can be provided independently by a particular one from among the PPU and SPUs, or otherwise can be provided by such a PPU and SPUs in a cooperative manner. Thus, such functional blocks can be realized by hardware components alone, software components alone, or various combinations thereof, which can be readily conceived by those skilled in this art. That is to say, such functional blocks are by no means restricted to any one of the aforementioned configurations.

The input information acquisition unit 102 is configured to acquire a request signal such as a content startup/end request, viewpoint shifting request, and so forth, from the input device 20 according to the input operation performed by the user, and to transmit this information to the shifting condition adjustment unit 104, the frame coordinate determination unit 105, and the loading unit 108, as necessary. When the loading unit 108 receives a notice that a content startup request has been given via the input information acquisition unit 102, the loading unit 108 reads out, from the hard disk drive 50, the data of the initial image included in the hierarchical data 116, the speed map 118, scenario data 119, and so forth, as necessary data for the image display operation, and stores the data thus read out in the main memory 60. For displaying the initial image on the display device 12, the decoding unit 106 decodes the data, and the display image processing unit 114 renders the image data thus decoded to the frame memory as appropriately.

When the user performs an input operation via the input device 20 for inputting an instruction to start to shift the viewpoint according to the scenario data, the frame coordinate determination unit 105 receives a corresponding notice from the input information acquisition unit 102, and reads out the scenario data 110 stored in the main memory 60. Subsequently, the frame coordinate determination unit 105 calculates the frame coordinates for the next display update time point determined according to a predetermined frame rate by performing interpolation of the key frames defined beforehand. Specifically, the frame coordinate determination unit 105 determines the frame coordinates for each display update time point using a predetermined interpolation method based upon the frame coordinates written in the scenario data as the next shifting-destination frame and the shifting time taken for the viewpoint to be shifted to the next shifting-destination frame.

In a case in which either time adjustment or path adjustment is performed using the method described later when the scenario data is generated, there is no need to adjust the viewpoint shifting speed in the image display stage. On the other hand, in a case in which such adjustment is not performed when the scenario data is generated, the viewpoint shifting speed is adjusted in the same way as with the case in which the viewpoint is shifted according to the user's input operation, as described below.

When the user operates an operating means for image enlarging/reducing or image scrolling assigned to the input device 20, the frame coordinate determination unit 105 receives a signal which indicates the operation state from the input information acquisition unit 102, and determines the frame coordinates for the next display update time point based upon the operation state thus received. For example, when the analog stick 27a is operated, the frame coordinate determination unit 105 calculates the updated frame coordinates based upon the velocity vector that corresponds to the tilting direction and tilting angle. When a forward-shifting operation or otherwise a backward-shifting operation is performed via the directional key 21, or when a display area is to be guided to a certain area, the frame coordinate determination unit 105 reads out the coordinates of the key frame to be displayed in the next stage, and calculates the frame coordinates at the next display update time point by interpolating a frame between the current display area and the next key frame.

If the input value of the user's input operation for the input device 20, such as the tilting direction, tilting angle, and so forth, of the analog stick 27a, is directly converted into the velocity vector of the viewpoint at this time point, it can be conceived that the viewpoint would be shifted with an excessively high responsivity, leading to a problem in that it would be hard for the user to follow the viewpoint shifting, or otherwise a problem of discontinuous viewpoint shifting. In order to solve such a problem, the frame coordinate determination unit 105 performs a convolution operation for convolving a rectangular wave signal which represents the requested shifting amount received from the input device 20 with a predetermined transfer function so as to gradually change the velocity vector. Here, such a transfer function may be configured as a Gaussian function. Also, when the frame is shifted to a key frame defined in the scenario data according to an operation of the button once, by generating a rectangular wave signal having a similar shape, and by performing a convolution operation for convolving the rectangular wave signal thus generated with a transfer function, such an arrangement allows the viewpoint to be shifted without the user experiencing sensations of discomfort. Detailed description thereof will be made later.

Before the frame coordinate determination unit 105 calculates the velocity vector, or performs interpolation so as to obtain a frame before the next key frame is reached, the shifting condition adjustment unit 104 is configured to adjust the viewpoint shifting speed such that it does not exceed the allowable speed acquired based upon the speed map 118 for all the sections on the shifting path. The frame coordinate determination unit 105 is configured to calculate the velocity vector or to perform frame interpolation based upon the adjustment results obtained by the shifting condition adjustment unit 104. The shifting condition adjustment unit 104 may be configured to directly adjust the value of the speed, or otherwise may be configured to indirectly adjust the speed by adjusting the maximum value of the transfer function or the like. Specific examples will be described later.

The decoding unit 106 is configured to decode a part of the image data read from the main memory 60, and to store the decoded data in the buffer memory 70. The data to be decoded by the decoding unit 106 may be image data having a predetermined size including the display region. By decoding the image data over a wide area beforehand, and by storing the image data thus decoded in the buffer memory 70, the number of times the image data is read out from the main memory 60 can be reduced, thereby providing smooth viewpoint shifting. The display image processing unit 114 is configured to acquire the frame coordinates of the area that should be newly displayed, which is determined by the frame coordinate determination unit 105, to read out the corresponding image data from the buffer memory 70, and to render the image data in the frame memory of the display processing unit 44.

Next, description will be made regarding a specific example of the speed map. As described above, the time required to actually display the area to be displayed depends on the processing capacity of the system configured to display an image, i.e., mainly the decoding processing capacity SD[i] and the data transfer capability ST for transferring data to the display device 12, and the data size m of the image data. Here, the variable i represents an identification number for identifying the compression format which is to be decoded by the decoding unit 106. With the present embodiment, the data size m is determined for each tile image.

The decoding processing time Td and the data transfer time Tt are respectively represented by the following Expressions.

$Td=m/SD[i]$.

$Tt=m/ST$.

Thus, the sum total of the processing time T is represented by $T=m(1/SD[i]+1/ST)$.

Here, with the processing time taken by a reference display system to perform processing on the image data having a reference data size M as a reference processing time Tst, when the speed map is to be calculated for a given display system, the ratio of the processing time T for the given display system to perform the processing on the same image data with respect to the reference processing time Tst is represented by L[i]. In this case, the ratio R of the time T for this system to perform the processing on the image data having the data size m with respect to the reference processing time Tst is represented by $R=T/Tst=L[i]\times m/M$. The variable R is a variable which depends on the data size of the tile image, the processing capacity of the display system, and the compression format of the data, and will be referred to as "processing time coefficient".

By preparing the variable L[i] for each display system for each compression format, and by acquiring the data size m of the tile image when the hierarchical data is generated or the like, such an arrangement allows the processing time coefficient R to be definitely determined for each tile image. The processing time coefficient R is a value obtained by normalizing the reciprocal of the upper limit of the allowable speed at which the viewpoint is to be shifted, i.e., the reciprocal of the speed limit, with respect to the reference processing value. With the present embodiment, the data having a hierarchical structure in which the processing time coefficient R to be used as an index of the speed limit is held for each tile image is employed as the speed map. Various methods can be conceived for adjusting the viewpoint shifting speed using the speed map. As a most simple configuration, an arrangement can be conceived in which the speed limit to be imposed on the current viewpoint is calculated based upon the speed map, and the speed limit thus calculated is used as the speed limit to be imposed on the subsequent viewpoint shifting steps to be executed in increments of very small time units. With such an arrangement, the speed adjustment is repeatedly performed in increments of such very small time units.

Figure 8:
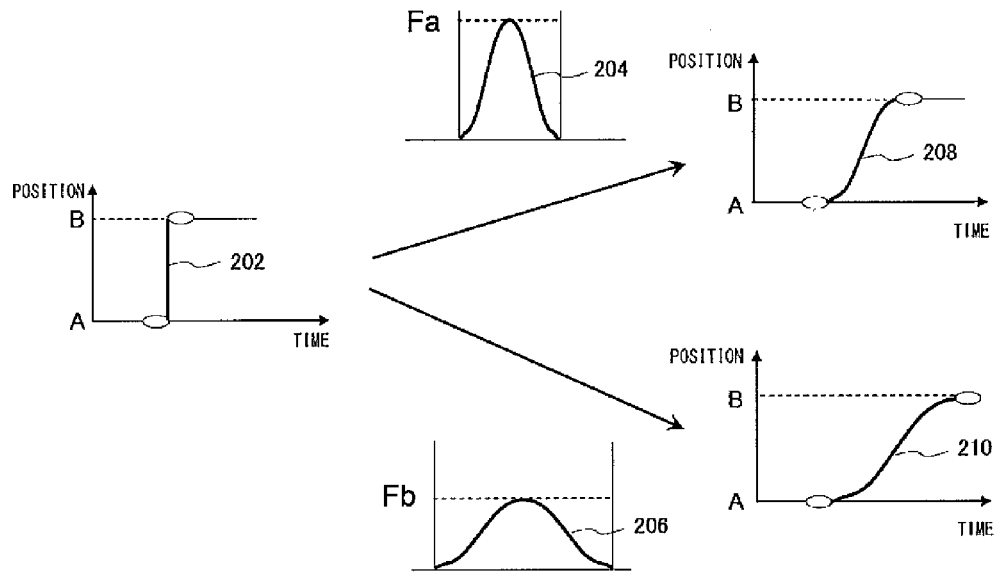
FIG. 8 is a diagram for describing the change in the viewpoint shifting speed with respect to the change in the maximum value of the transfer function in a case in which a Gaussian function is employed as the transfer function according to the present embodiment.

As another method, an arrangement can be conceived in which the viewpoint shifting speed is indirectly adjusted by adjusting the transfer function to be used for the convolution operation. FIG. 8 is a diagram for describing the change in the viewpoint shifting speed with respect to the change in the maximum value of the transfer function in a case in which a Gaussian function is employed as the transfer function. In this drawing, the change in position over time 202 is configured as input information that indicates when such an arrangement receives an instruction to shift the viewpoint from the position A to the position B. For example, when the user operates the directional key 21 of the input device 20 such that the viewpoint is to be shifted to the next key frame defined in the scenario data, such input information is received. In this case, the viewpoint shifting time is not determined in particular.

By performing convolution operation for the input information using the Gaussian function 204, the change of position over time 208 is obtained. That is to say, such an arrangement provides viewpoint shifting such that the viewpoint is gradually shifted from the position A, is shifted at its maximum shifting speed at the intermediate point, and is shifted to the position B with the shifting speed being gradually reduced. Here, the maximum shifting speed is determined by the maximum value Fa of the Gaussian function 204. Thus, by performing a convolution operation using a different Gaussian function 206 having a maximum value Fb that is smaller than Fa, such an arrangement is capable of reducing the maximum speed, thereby lengthening the time taken for the viewpoint to reach the position B. That is to say, such an arrangement provides the viewpoint shifting as indicated by the change in position over time 210.

Thus, by adjusting the maximum value of the Gaussian function according to the change in the processing time coefficient R defined in the speed map, such an arrangement is capable of adjusting the viewpoint shifting speed such that it does not exceed the speed limit for all the sections on the path from the position A up to the position B. Specifically, weighted averaging is performed for the reciprocals of the respective processing time coefficients R that correspond to the respective tile images for each frame on the path from the position A up to the position B, with a weighting factor that corresponds to the area included in each frame, so as to calculate a value to be used as an index which indicates the shifting speed limit at this frame position, i.e., the speed limit index.

Next, the smallest speed limit index is specified from among the speed limit indexes thus calculated on the path, and the maximum value of the Gaussian function is adjusted according to the smallest speed limit index thus specified. The area for which the smallest speed limit index is obtained on the path has the largest data size. Thus, by adjusting the maximum viewpoint shifting speed such that it matches the smallest value of the speed limit index thus obtained, such an arrangement allows the viewpoint to be shifted smoothly regardless of the position of the section in which the tile image has the largest data size on the path, thereby preventing the occurrence of frame dropping and so forth for all the sections on the path when the viewpoint is being shifted.

With such an arrangement, by calculating beforehand, as a reference value, the maximum value of the optimum Gaussian function for the aforementioned reference processing, for example, such an arrangement is capable of relatively adjusting the maximum value of the Gaussian function based upon the ratio of the limit speed index. Description has been made regarding an arrangement in which the viewpoint destination position B is set according to an instruction from the user. Also, by setting the destination predicted by the aforementioned prefetch processing to the position B, the same adjustment may also be applied to the case in which the viewpoint is gradually shifted according to the user's input operation.

Next, description will be made regarding an apparatus configured to support a scenario data generating operation. FIG. 9 shows a detailed configuration of the control unit 100b having a function of supporting the scenario data generating operation. The hard disk drive 50 stores the hierarchical data 116 and the speed map 118. The hierarchical data 116 and the speed map 118 are loaded into the main memory 60 according to an instruction input by the user to start to generate scenario data. The hard disk drive 50 may store a plurality of speed maps 118 prepared for different respective display systems having different processing capacities. In this case, correction of the setting information described below is performed for each speed map. As a result, the scenario data is generated for each display system.

The control unit 100b includes a setting information acquisition unit 120 configured to acquire scenario data setting information created by the scenario data creator, a shifting speed judgment unit 112 configured to judge whether or not the viewpoint shifting speed obtained based upon the setting information is allowable, a speed limit exceedance notifying unit 126 configured to notify the scenario data creator when the viewpoint shifting speed obtained based upon the setting information exceeds the speed limit, a setting information correcting unit 124 configured to correct the setting information when the viewpoint shifting speed obtained based upon the setting information exceeds the speed limit, and a scenario data generating unit 128 configured to generate conclusive scenario data without involving a problem of viewpoint shifting speed exceeding the speed limit.

The setting information acquisition unit 120 is configured to acquire the coordinates of multiple key frames, viewpoint shifting times between the key frames, and so forth, which are input by the scenario data creator via the input device 20, and to store the data thus acquired in the main memory 60. For example, the setting information acquisition unit 120 is configured to instruct the display device 12 to display a GUI (Graphical User Interface) for creating the scenario data, which prompts the scenario data creator to specify the key frames and the viewpoint shifting times between the frames.

For example, the setting information acquisition unit 120 has the same configuration as that of the control unit 100a having a display function shown in FIG. 7. With such an arrangement, the scenario data creator moves the viewpoint using the input device 20 while monitoring the image displayed on the display device 12. Furthermore, the scenario data creator specifies the frame coordinates of each key frame by pressing a predetermined button of the input device 20 in a state in which a desired frame is displayed. At the same time, the scenario data creator inputs the viewpoint shifting time using a numerical keypad (not shown) or the like included in the input device 20. The setting information acquisition unit 120 is configured to insert additional key frames on the path as necessary, by interpolating, along a straight line or otherwise a desired curve, the coordinate points of the multiple key frames thus specified.

Alternatively, the setting information acquisition unit 120 may be configured to instruct the display device 12 to display a text editor screen which allows the scenario data creator to input character strings using a keyboard (not shown) or the like, thereby allowing key frame information to be registered. For example, such an arrangement allows the scenario data creator to set items such as the coordinates of each key frame, the display time for the key frame, and the viewpoint shifting time taken for the viewpoint to reach the next key frame, using a markup language such as XML.

The shifting speed judgment unit 122 acquires the viewpoint shifting speed with reference to the information which indicates the frame coordinates and the viewpoint shifting time acquired by the setting information acquisition unit 120. Furthermore, the shifting speed judgment unit 122 acquires the speed limit index on the path based upon the processing time coefficient R for each tile image included in the path thus set, with reference to the speed map 118 loaded into the main memory 60. The shifting speed judgment unit 122 compares the viewpoint shifting speed with the speed limit index so as to judge whether or not the viewpoint shifting speed exceeds the speed limit.

For example, in a case in which the viewpoint is to be shifted between the key frames at a speed that changes in a Gaussian function manner, the maximum value of the Gaussian function is obtained based upon the minimum value of the speed limit index on the path, as described above. Next, comparison is made between the time required for the viewpoint to be shifted between the key frames, which is determined by the Gaussian function thus obtained, and the viewpoint shifting time for shifting the viewpoint between the key frames, which is set according to the setting information. When the viewpoint shifting time thus set is shorter than the time required for the viewpoint to be shifted, judgment can be made that the speed of the viewpoint shifting time thus set is too fast, which in some cases leads to a problem of frame dropping and so forth. It should be noted that the speed obtained by performing calculation assuming that the change in position between the adjacent key frames occurs linearly over time may be compared with a value obtained by converting the speed limit index into an actual speed limit, or the like.

When the shifting speed judgment unit 122 judges that the viewpoint shifting time thus set is higher than the speed limit, the speed limit exceedance notifying unit 126 notifies the scenario data creator of this information via the display device 12 or the like. In this case, such an arrangement allows the scenario data creator to adjust the setting values, such as lengthening the viewpoint shifting time.

When the shifting speed judgment unit 122 judges that the viewpoint shifting time thus set is higher than the speed limit, the setting information correcting unit 124 corrects the setting information. Specifically, the setting information correcting unit 124 lengthens the viewpoint shifting time between the key frames until the viewpoint shifting speed does not exceed the speed limit. Alternatively, in this case, the setting information correcting unit 124 leaves the viewpoint shifting time as it is, and corrects the viewpoint shifting path. With such an arrangement, by inserting frames as key frames on the corrected path between the key frames set by the scenario data creator, the viewpoint is shifted on the corrected path when the image is displayed on the display system. Description will be made later regarding a specific example for modifying the path.

In either case, after the correction, the shifting speed judgment unit 122 may judge whether or not the viewpoint shifting speed does not exceed the speed limit in the same way as described above. Before the correction, the speed limit exceedance notifying unit 126 may notify the scenario data creator of this information in order to confirm whether or not the correction is to be made, and may actually perform a correction operation only when the scenario data creator permits the correction. Also, such an arrangement may allow the scenario data creator to further confirm the correction result.

The scenario data generating unit 128 is configured to generate the scenario data including necessary information such as the finally-determined coordinates of each key frame, the viewpoint shifting time, and identification information for the hierarchical image data 116, and to output the scenario data thus generated to the main memory 60 or the like. Furthermore, the scenario data thus generated may be combined with the hierarchical image data 116 in the form of a single file, thereby generating a content file.

Figure 10:
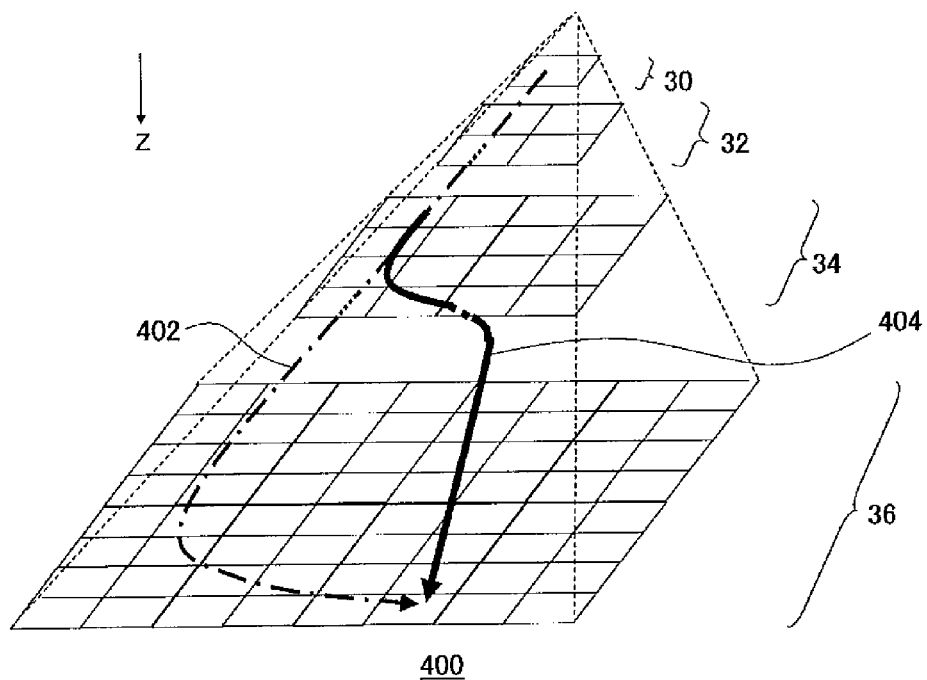
FIG. 10 is a diagram for describing a specific example in a case in which a setting information correcting unit according to the present embodiment corrects a path.

FIG. 10 is a diagram for describing a specific example in a case in which the setting information correcting unit 124 corrects the path. Description will be made assuming that, in the hierarchical data 400 shown in the drawing, the shift on the path 402 (line of dashes and dots) exceeds the speed limit. In this case, the path is modified along the Z-axis direction in a virtual space formed based upon the hierarchical data 400 such that, for at least one section through which the viewpoint is to be shifted, the image data that belongs to a hierarchical level one level higher than that employed for displaying the original path 402 is employed. In this drawing, a part of the path along which the viewpoint is to be shifted on the third level 36 is modified such that it is to be shifted on the second level 34, thereby providing the corrected path 404 (solid line).

As the hierarchical level of the image data to be employed is raised by one level, the image resolution is reduced as compared with the setting information. However, such a modification reduces the data size to be processed, which reduces the processing time coefficient R, thereby increasing the speed limit index. Thus, such a modification relaxes the speed limit imposed on the path although the viewpoint is to be shifted in a similar manner. Thus, such an arrangement allows the viewpoint to reach the destination key frame without changing the viewpoint shifting time for shifting the viewpoint between the frames. In actuality, in the example shown in FIG. 10, such a modification can be realized by inserting at least one frame of the second level 34 as a key frame.

It should be noted that the path may be modified employing the image data that belongs to a hierarchical level two levels or more higher than that of the original path. Also, as a method for modifying the path, the path may be modified according to a predetermined rule according to the situation in which the viewpoint shifting speed exceeds the speed limit. Also, the path may be gradually changed, and, at the point at which the viewpoint shifting speed does not exceed the speed limit, the path thus changed may be employed as the final modified result. Description has been made with reference to FIG. 10 regarding an arrangement in which the hierarchical level to be used is changed. Also, an arrangement may be made configured to search for a path with a relaxed speed limit with reference to the speed map without changing the hierarchical level.

Next, description will be made regarding the operation of the information processing apparatus 10 configured to support the operation for creating the scenario data. FIG. 11 is a flowchart showing the procedure for supporting the operation for creating the scenario data. In the flowchart shown in FIG. 11, each step of each operation will be indicated by a combination of "S" (which is the initial letter of "Step") which represents "Step" and a number. With such an arrangement, when the judgment result is "true" in a given judgment step represented by a combination of "S" and a number, the judgment result is represented by the addition of "Y" (which is the initial letter of "Yes"). In this case, the judgment result is represented by "Y in S10", for example. Conversely, when the judgment result is "false", the judgment result is represented by the addition of "N" (which is the initial letter of "No"). In this case, the judgment result is represented by "N in S10", for example.

When the scenario data creator inputs an instruction to start a scenario data creating operation, the operation shown in the flowchart in FIG. 11 is started. First, when the scenario data creator inputs an instruction to start the scenario data creating operation (S30), the setting information acquisition unit 120 instructs the display device 12 to display a screen on which rectangles are superimposed on a target image so as to allow the scenario data creator to specify a key frame, or a viewpoint shifting time setting screen, and acknowledges the user's input operation, thereby acquiring the setting information (S32).

In this stage, key frame interpolation is performed as necessary using a predetermined interpolation method. Next, with reference to the speed map, the shifting speed judgment unit 122 judges whether there is no section where the viewpoint shifting speed is higher than the speed limit, from among the viewpoint shifting sections between the key frames determined by the setting information (S34). When judgment is made that there is at least one section where the viewpoint shifting speed is higher than the speed limit (N in S34), the speed limit exceedance notifying unit 126 notifies the scenario data creator of this information, and the setting information correcting unit 124 corrects the setting information (S38 or S40).

In this stage, the speed limit exceedance notifying unit 126 prompts the scenario data creator to input an instruction of whether the viewpoint shifting speed or the image quality is to be prioritized. Alternatively, such an arrangement reads out information of whether the viewpoint shifting speed or the image quality is to be prioritized. Subsequently, the flow proceeds in a branched manner to either a path correction step or a viewpoint shifting time correction step. That is to say, when the viewpoint shifting speed is prioritized, a part of the path is changed to a hierarchical level one or more levels higher than that of the original path while the viewpoint shifting time is maintained at the same value as that defined in the setting information (Y in S36 and S38). On the other hand, when the image quality is prioritized instead of the viewpoint shifting speed, the setting value for the viewpoint shifting time is lengthened (N in S36 and S40). At the same time, after the shifting speed judgment unit 122 checks the corrected result, and confirms that the viewpoint shifting speed does not exceed the speed limit, the corrected path or otherwise the corrected viewpoint shifting time is finally determined.

Subsequently, the scenario data generating unit 128 describes necessary data such as the finally-determined key frames, the viewpoint shifting time between the key frames, and the identification information for identifying the hierarchical image data, into a predetermined format, thereby generating and outputting the scenario data (S42). Also, when judgment is made in S34 that the viewpoint shifting speed does not exceed the speed limit, the same processing is performed (Y in S34, and S42). It should be noted that, in this case, the speed limit exceedance notifying unit 126 may notify the scenario data creator only that the viewpoint shifting speed exceeds the speed limit, instead of performing such correction processing as indicated by S38 or S40. Such an arrangement may allow the scenario data creator to repeatedly perform a procedure in which the scenario data creator corrects or inputs the setting information as desired, the shifting speed judgment unit 122 again judges the setting information thus modified, and when the viewpoint shifting speed exceeds the speed limit, the shifting speed judgment unit 122 notifies the scenario data creator of this information. Such an arrangement allows the scenario data creator himself/herself to determine the final setting information.

With the present embodiment as described above, a speed map for calculating the index of the speed limit imposed on the viewpoint shifting operation is generated in association with the image data which includes data of display target image with multiple different resolutions. The speed map is configured as data holding the processing time coefficient for each area such as the tile image obtained by dividing each of the images having different respective resolutions. The processing time coefficient is a value which depends on the data size of the tile image, the processing capacity of the system configured to display the image, and the image compression format, and represents the length of the time taken to decode or transmit the tile image.

By generating such a speed map, the viewpoint shifting speed can be adjusted within an allowable range. Thus, when the corresponding image is displayed, an abnormal operation such as frame dropping can be prevented from occurring due to the viewpoint shifting speed exceeding the speed limit. Such a speed map can be generated for each display system. Thus, for example, the content data may include, together with the image data, multiple speed maps obtained such that they are respectively associated with multiple display systems. When the display operation is performed in one of the display systems, by selectively reading out the speed map that corresponds to the current display system, the viewpoint shifting speed can be adjusted in an adaptive manner.

In a case in which the viewpoint shifting speed at which the viewpoint is to be shifted from the start point up to the end point is calculated by means of the convolution operation, the viewpoint shifting speed is adjusted by modifying, based upon the speed map, a function such as a Gaussian function or the like used in the convolution operation. Thus, smooth viewpoint shifting can be provided without exceeding the speed limit. In this case, by determining the maximum viewpoint shifting speed according to the strictest speed limit on the path, the viewpoint shifting speed can be prevented from exceeding the speed limit in a sure manner.

Also, in a mode in which the viewpoint is shifted via a path defined in the scenario data beforehand, based upon the speed map, such an arrangement is capable of confirming whether or not the viewpoint shifting between the key frames set by the scenario data creator involves a viewpoint shifting speed that is higher than the speed limit. Thus, such an arrangement is capable of supporting the scenario data creator to create appropriate scenario data. In a case in which the viewpoint shifting speed exceeds the speed limit, the viewpoint shifting time between the key frames thus set should be modified, or otherwise the path should be modified such that image data having a low resolution is employed for a part of the path. By allowing the scenario data creator to determine whether the viewpoint shifting speed is prioritized or otherwise the image quality is prioritized, such an arrangement is capable of determining the scenario data that closely matches the scenario data creator's intentions without involving the viewpoint shifting speed exceeding the speed limit.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

Description has been made in the present embodiment regarding an arrangement in which, when the scenario data is created, the path is corrected based upon the speed map, for example. Also, when the image is displayed on the display system, the path may be corrected using the same method. When the viewpoint is shifted according to the scenario data, or when the display area is shifted to a desired key frame according to an instruction input by the user, the shifting condition adjustment unit may perform adjustment so as to prevent the viewpoint shifting speed from exceeding the speed limit by raising the hierarchical level of the path in the hierarchical data without changing the maximum value of the transfer function. Also, the viewpoint shifting speed adjustment and the path adjustment may be combined according to a predetermined rule. Also, such an arrangement may be configured to allow a content creator or a viewer to select a desired adjustment option.

Description has been made in the present embodiment regarding an arrangement configured to prepare a speed map which represents the distribution of the speed limit indexes with respect to the position on the image plane, and to adjust the viewpoint shifting speed with reference to the indexes set for the display area path along which the viewpoint is to be shifted. Also, the speed map may be configured as the distribution with respect to the viewpoint position. For example, the viewpoint coordinates, which consist of the image plane coordinates and the distance from the image plane, are sampled at a predetermined sampling pitch, and a distribution of the processing time coefficients R is generated by associating the processing time coefficients R for the respective display areas that correspond to the respective viewpoint coordinate points with the respective viewpoint coordinates, thereby generating the speed map. Also, such an arrangement is capable of adjusting the viewpoint shifting speed in the same operation as that of the present embodiment, examples of which include calculation of the speed limit index on the path by performing weighted averaging of the index values around the viewpoint path with a weighting factor that corresponds to the distance from the path.

DESCRIPTION OF THE REFERENCE NUMERALS

1 image processing system, 10 image processing apparatus, 12 display device, 20 input device, 38 tile image, 50 hard disk drive, 60 main memory, 100 control unit, 102 input information acquisition unit, 104 shifting condition adjustment unit, 105 frame coordinate determination unit, 106 decoding unit, 108 loading unit, 114 display image processing unit, 116 hierarchical data, 118 speed map, 119 scenario data, 120 setting information acquisition unit, 122 shifting speed judgment unit, 124 setting information correcting unit, 126 speed limit exceedance notifying unit, 128 scenario data generating unit.

INDUSTRIAL APPLICABILITY

As described above, the present invention is applicable to various kinds of information processing apparatuses such as computers, content executing apparatuses, image display apparatuses, image processing apparatuses, game machines, and so forth.

The invention claimed:

1. An image processing apparatus comprising:
an input information acquisition unit configured to acquire input information related to viewpoint shift on an image subjected to display;
a speed map storage unit configured to store a speed map holding a distribution of an index of processing time required to render a part of the image;
a shifting condition adjustment unit configured to adjust a viewpoint shifting speed that corresponds to the input information based upon the index of processing time corresponding to a shifting path held by the speed map;
a frame coordinate determination unit configured to determine frame coordinates of a frame to be displayed based on the viewpoint shifting speed thus adjusted; and
a display image processing unit configured to process image data corresponding to the frame coordinates so as to render a display image.

2. An image processing apparatus according to claim 1, wherein the speed map represents a distribution of the index of the processing time required to render each area obtained by partitioning the image subjected to display, with respect to the position on the image, and
wherein the shifting condition adjustment unit is configured to adjust the viewpoint shifting speed with reference to the index of the processing time on a frame shifting path determined by viewpoint shifting.

3. An image processing apparatus according to claim 1, wherein the speed map represents a distribution of the index of the processing time required to render a frame determined by the viewpoint position, with respect to the viewpoint position, and
wherein the shifting condition adjustment unit is configured to adjust, with reference to the index of the processing time, the viewpoint shifting speed on the viewpoint shifting path.

4. An image processing apparatus according to claim 1, wherein the frame coordinate determination unit is configured to calculate an amount of viewpoint shift between frames by performing a convolution operation on a rectangular signal, which indicates a requested amount of viewpoint shift acquired by the input information acquisition unit as the input information, and a transfer function having a predetermined form, so as to determine the frame coordinates, and
wherein the shifting condition adjustment unit is configured to adjust a maximum value of the transfer function based upon the index of the processing time corresponding to the viewpoint shifting path.

5. An image processing apparatus according to claim 1, wherein data of the image subjected to display has a hierarchical structure having a plurality of image data having different respective resolutions that are hierarchized in order of resolution, and
wherein the speed map has a hierarchical structure holding a distribution of index of the processing time for each image of each hierarchical level of the data of the image.

6. An image processing apparatus according to claim 1, wherein the shifting condition adjustment unit is further configured to modify the viewpoint shifting path by changing at least a part of the viewpoint shifting path such that the viewpoint shifting speed that corresponds to the input information does not exceed a speed limit imposed on the viewpoint shifting path which is acquired from the index of the processing time.

7. An image processing apparatus according to claim 1, wherein the speed map storage unit is configured to store the speed maps respectively generated for apparatuses having different respective processing capacities, and
wherein the shifting condition adjustment unit is configured to select the speed map generated based upon the processing capacity of the image processing apparatus itself, and to refer to the speed map thus selected.

8. A content creating support apparatus configured to support an operation for creating scenario data that defines viewpoint shifting in content in which an image is displayed while the viewpoint on the image is being shifted, the content creating support apparatus comprising:
a setting information acquisition unit configured to acquire setting information with respect to coordinates of a plurality of key frames that function as frame waypoints, and to a viewpoint shifting time taken for viewpoint to be shifted between the key frames, set by the user so as to define the viewpoint shifting;
a speed map storage unit configured to store a speed map holding a distribution of an index of processing time required to render a part of the image;
a shifting speed judgment unit configured to judge whether or not a viewpoint shifting speed that corresponds to the setting information exceeds a speed limit imposed on a path of the viewpoint shifting, the speed limit being acquired from the index of the processing time;
a setting information correcting unit configured to correct the setting information when the viewpoint shifting speed exceeds the speed limit imposed on the path of the viewpoint shifting; and
a scenario data generating unit configured to generate final scenario data based upon a corrected result obtained by the setting information correcting unit.

9. A content creating support apparatus according to claim 8, wherein the setting information correcting unit is configured to lengthen the viewpoint shifting time between the key frames, which is included in the setting information, such that the viewpoint shifting speed does not exceed the speed limit imposed on the path of the viewpoint shifting.

10. A content creating support apparatus according to claim 8, wherein the setting information correcting unit is configured to change the path of the viewpoint shifting between the key frames, which is included in the setting information, such that the viewpoint shifting speed does not exceed the speed limit imposed on the path of the viewpoint shifting.

11. A content creating support apparatus according to claim 10, wherein the image data to be displayed has a hierarchical structure having a plurality of image data having different respective resolutions hierarchized in order of resolution, and wherein the setting information correcting unit is configured to change the path of the viewpoint shifting in a virtual space defined by both a hierarchical structure of image planes and a resolution axis orthogonal to the image planes.

12. A content creating support apparatus according to claim 8, wherein the speed map storage unit is configured to store speed maps respectively generated for apparatuses having different respective processing capacities, and
wherein the scenario data generating unit is configured to generate final scenario data for each content executing system based upon the setting information corrected for each content executing system.

13. An image processing method comprising:
acquiring input information related to viewpoint shift on an image subjected to display;
reading out, from memory, a speed map holding a distribution of an index of processing time required to render a part of the image;
adjusting a viewpoint shifting speed, which corresponds to the input information based upon the index of processing time corresponding to a shifting path held by the speed map;
determining frame coordinates of a frame to be displayed based on the viewpoint shifting speed thus adjusted; and
processing image data corresponding to the frame coordinates so as to render a display image to be stored in a frame memory.

14. A content creating support method for supporting an operation for creating scenario data that defines viewpoint shifting in content in which an image is displayed while the viewpoint on the image is being shifted, the content creating support method comprising:
acquiring setting information with respect to coordinates of a plurality of key frames that function as frame waypoints, and to a viewpoint shifting time taken for viewpoint to be shifted between the key frames, set by the user so as to define the viewpoint shifting;
reading out, from a memory, a speed map holding a distribution of an index of processing time required to render a part of the image;
judging whether or not a viewpoint shifting speed that corresponds to the setting information exceeds a speed limit imposed on a path of the viewpoint shifting, the speed limit being acquired from the index of the processing time;
correcting the setting information when the viewpoint shifting speed exceeds the speed limit imposed on the path of the viewpoint shifting; and
generating final scenario data based upon a corrected result obtained by the setting information correction, and storing the final scenario data in a memory.

15. A computer program embedded in a non-transitory computer readable storage medium, comprising:
a module configured to provide a function of acquiring input information related to viewpoint shift on an image subjected to display;
a module configured to provide a function of reading out, from memory, a speed map holding a distribution of an index of processing time required to render a part of the image;
a module configured to provide a function of adjusting a viewpoint shifting speed, which corresponds to the input information based upon the index of processing time corresponding to a shifting path held by the speed map;
a module configured to provide a function of determining frame coordinates of a frame to be displayed based on the viewpoint shifting speed thus adjusted; and
a module configured to provide a function of processing image data corresponding to the frame coordinates so as to render a display image to be stored in a frame memory.

16. A computer program embedded in a non-transitory computer readable storage medium, configured to instruct a computer to provide a function of supporting an operation for creating scenario data that defines viewpoint shifting in content in which an image is displayed while the viewpoint on the image is being shifted, wherein the computer program comprising:
a module configured to provide a function of acquiring setting information with respect to coordinates of a plurality of key frames that function as frame waypoints, and to a viewpoint shifting time taken for viewpoint to be shifted between the key frames, set by the user so as to define the viewpoint shifting;
a module configured to provide a function of reading out, from a memory, a speed map holding a distribution of an index of a processing time required to render a part of the image;
a module configured to provide a function of judging whether or not a viewpoint shifting speed that corresponds to the setting information exceeds a speed limit imposed on a path of the viewpoint shifting, the speed limit being acquired from the index of the processing time;
a module configured to provide a function of correcting the setting information when the viewpoint shifting speed exceeds the speed limit imposed on the path of the viewpoint shifting; and
a module configured to provide a function of generating final scenario data based upon a corrected result obtained by the function of correcting the setting information, and storing the final scenario data in a memory.

17. A non-transitory, computer readable medium containing a computer program, wherein the computer program comprises:
a module configured to provide a function of acquiring input information related to viewpoint shift on an image subjected to display;
a module configured to provide a function of reading out, from memory, a speed map holding a distribution of an index of processing time required to render a part of the image;
a module configured to provide a function of adjusting a viewpoint shifting speed, which corresponds to the input information based upon the index of processing time corresponding to the shifting path held by the speed map;
a module configured to provide a function of determining frame coordinates of a frame to be displayed based upon the viewpoint shifting speed thus adjusted; and
a module configured to provide a function of processing image data corresponding to the frame coordinates so as to render a display image to to be stored in a frame memory.

18. A non-transitory, computer readable storage medium containing a computer program configured to instruct a computer to provide a function of supporting an operation for creating scenario data that defines viewpoint shifting in content in which an image is displayed while the viewpoint on the image is being shifted, wherein the computer program comprising:

a module configured to provide a function of acquiring setting information with respect to coordinates of a plurality of key frames that function as frame waypoints, and to a viewpoint shifting time taken for the viewpoint to be shifted between the key frames, set by the user so as to define the viewpoint shifting;

a module configured to provide a function of reading out, from memory, a speed map holding a distribution of an index of a processing time required to render a part of the image;

a module configured to provide a function of judging whether or not a viewpoint shifting speed that corresponds to the setting information exceeds a speed limit imposed on a path of the viewpoint shifting, the speed limit being acquired from the index of the processing time;

a module configured to provide a function of correcting the setting information when the viewpoint shifting speed exceeds the speed limit imposed on the path of the viewpoint shifting; and a module configured to provide a function of generating final scenario data based upon a corrected result obtained by the function of correcting the setting information, and storing the final scenario data in a memory.

19. A non-transitory, computer readable storage medium containing an image file to be read out in order to display an image while viewpoint is being shifted, the image file having a data structure comprising:

image data to be displayed; and a speed map holding a distribution of an index of processing time required to render a part of the image, which is to be referred to in order to determine a upper limit of a viewpoint shifting speed, wherein the image data and the speed map are associated with each other.

* * * * *